(12) United States Patent
Whalen et al.

(10) Patent No.: US 7,783,672 B2
(45) Date of Patent: Aug. 24, 2010

(54) SUPPORT MECHANISMS FOR IMPROVED GROUP POLICY MANAGEMENT USER INTERFACE

(75) Inventors: William J. Whalen, Seattle, WA (US); Carey Tanner, Gold Bar, WA (US); Matthew Wetmore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 10/410,887

(22) Filed: Apr. 9, 2003

(65) Prior Publication Data

US 2004/0215627 A1    Oct. 28, 2004

(51) Int. Cl.
*G06F 17/30*    (2006.01)
*G06F 7/00*    (2006.01)

(52) U.S. Cl. .................. 707/802; 707/694; 715/765; 715/810; 715/825; 715/853; 726/1

(58) Field of Classification Search .................. None
See application file for complete search history.

(56) References Cited

U.S. PATENT DOCUMENTS

| | | | |
|---|---|---|---|
| 5,664,133 A * | 9/1997 | Malamud et al. ............ 715/816 |
| 6,160,550 A * | 12/2000 | Nakajima et al. ............ 715/745 |
| 6,243,700 B1 * | 6/2001 | Zellweger ...................... 707/3 |
| 6,247,020 B1 * | 6/2001 | Minard ..................... 707/104.1 |
| 6,567,808 B1 * | 5/2003 | Eschelbeck et al. ............ 707/10 |
| 6,947,991 B1 * | 9/2005 | Burton et al. ................ 709/227 |
| 2002/0032706 A1 * | 3/2002 | Perla et al. ................... 707/530 |
| 2002/0133579 A1 * | 9/2002 | Bernhardt et al. ............ 709/223 |
| 2002/0188603 A1 * | 12/2002 | Baird et al. ..................... 707/3 |
| 2003/0076358 A1 * | 4/2003 | Nakajima et al. ............ 345/765 |
| 2003/0135665 A1 * | 7/2003 | Barker et al. ................. 709/328 |
| 2003/0182287 A1 * | 9/2003 | Parlanti ....................... 707/10 |
| 2005/0204309 A1 * | 9/2005 | Szeto ......................... 715/811 |
| 2006/0288111 A1 * | 12/2006 | Katinsky et al. ............. 709/228 |
| 2007/0250840 A1 * | 10/2007 | Coker et al. ................. 719/320 |
| 2008/0109472 A1 * | 5/2008 | Underwood et al. ........ 707/102 |

OTHER PUBLICATIONS

Fullerton, Sean and Hudson, James. "Special Edition Using Microsoft Active Directory". Que Corporation, 2001. pp. 356-357, 369, 374-376, 400 and 402-404.*

Fullerton, Sean and Hudson, James. "Special Edition Using Microsoft Active Directory". Que Corporation, 2001. pp. 38-41.*

* cited by examiner

*Primary Examiner*—Charles Rones
*Assistant Examiner*—Alicia M Lewis
(74) *Attorney, Agent, or Firm*—Lee & Hayes, PLLC

(57) ABSTRACT

Provided are support mechanisms for a user interface mechanism that performs group policy management. The support mechanisms include a context menu map that provides a consistent and efficient way to generate interactive context menus for nodes using only straightforward declarations. The declarations are processed to invoke code with corresponding parameters that in turn generates a data structure corresponding to a context menu that is to be displayed. The data structure is processed into another data structure, from which data is extracted to meet the requirements of a hosting management application. An intermediary communications object is provided to separate the user interface into multiple components which each exchange data. A progress dialog is also provided to update the user as to the progress of lengthy operations performed on various managed objects, and to drive those operations. Refresh logic replicates changes made at one location in the user interface to other nodes.

10 Claims, 10 Drawing Sheets

SUPPORT MECHANISMS FOR IMPROVED GROUP POLICY MANAGEMENT USER INTERFACE

CROSS-REFERENCE TO RELATED APPLICATIONS

The present invention is related to the following copending United States Patent Applications, entitled "Method and System for Representing Group Policy Object Topology and Relationships" (U.S. application Ser. No. 10/410,883 filed Apr. 9, 2003), "Method and System for Implementing Group Policy Operations" (U.S. application Ser. No. 10/410,865 filed Apr. 9, 2003), and "Interfaces and Methods for Group Policy Management" (U.S. application Ser. No. 10/411,876 filed Apr. 9, 2003), filed concurrently herewith. Each related application is assigned to the assignee of the present patent application and hereby incorporated by reference in its entirety.

FIELD OF THE INVENTION

The invention relates generally to computer systems and networks, and more particularly to policies used in computer networks.

BACKGROUND OF THE INVENTION

In contemporary computing networks, network administrators define policies for users and computer systems of that network. With a Microsoft Windows®-based operating system, administrators use Group Policy technology to define the state of users' work environment, and rely on the system to enforce the defined policies. In general, those policies are then applied to determine how the various computer systems are configured. For example, the configuration that a user sees when logged onto any computer system of the network depends on the policy settings for that machine combination with the policy settings for that user.

In such a network, Group Policy can be used to specify many of the settings for a user and computer, including registry-based policy settings used to configure and specify behavior of the operating system and optionally application programs based on settings in various computer systems' registries, and script-related policy settings control scripts for computer startup and shutdown, and user logon and logoff. Group policy can also specify particular software programs for groups of users and/or machines, as Group Policy includes settings for centrally managing the installation, updates, and removal of application programs and components. Security options are also provided by policy settings, e.g., for local computer, domain, and network security settings. Folder redirection options, which allow administrators to redirect users' special folders to the network, also may be managed via Group Policy, as can Internet Explorer Maintenance, which is used to manage settings related to Internet Explorer and Remote Installation Services options, which are used to manage client configuration options that users see when performing Remote Installation Services-based installs. Internet Protocol Security Settings and Wireless settings can also be deployed through Group Policy, and public key policy settings, as well as software restriction policies can also be managed.

To apply and enforce the policy in a Windows®-based operating system, the Group Policy settings that administrators create are contained in group policy objects (GPOs), which in turn are applied to one or more scopes of management, such as a site, domain, or organizational unit (OU) in Active Directory®. A site, domain, or organizational unit may also be referred to as a scope of management, or SOM. In this manner, administrators centrally apply policy to users and computers of those sites, domains, and organizational units. Policy settings from each of these different hierarchical levels are combined and applied to the policy recipients. Any conflicting policy among the levels is resolved via various rules, as generally described in U.S. Pat. No. 6,466,932, herein incorporated by reference.

While group policy is a very powerful technology, and group policy objects greatly simplify network administration, group policy objects are not simple objects, but rather virtual objects comprising complex pieces of setting definitions that are stored on the domain. In general, each group policy object comprises multiple subcomponents, typically including a collection of many files, other objects and attributes, that reference one another in various ways. As a result, managing group policy requires a sophisticated understanding of various sets of data, as well as convenient and efficient ways to interact with that data. However, the toolset for managing group policy is difficult to use, yet fairly limited, making it difficult for administrators to understand the group policy environment and thus make effective use of group policy. What is needed is an improved set of group policy management tools, along with a corresponding user interface with features to leverage those management tools, to allow administrators to effectively manage group policy.

SUMMARY OF THE INVENTION

Briefly, the present invention provides support mechanisms for a user interface that facilitates group policy management. The support mechanisms include a context menu map that provides a consistent and highly efficient way to generate interactive context menus for nodes displayed on the user interface, using only very simple declarations. Another support mechanism comprises an intermediary communications object that allows the user interface to be cleanly separated into multiple components which each exchange data with a host of the user interface via the intermediary object. A multi-purpose progress dialog is also provided to update the user as to the progress of lengthy operations performed on various managed objects, and to drive those operations. Refresh logic provides another support mechanism that keeps the user interface data consistent, by replicating changes made at one location in the user interface to other nodes for updating their data accordingly.

The context menu map comprises a simple set of declarations corresponding to context menu items for a node. These declarations are compiled into data in a static structure data, along with methods for processing that data. For each node, when that node's context menu map is first requested by a host program, the static data structure is converted by shared methods of the node's base class into a data structure that corresponds to a format required by the host program. The node is allowed to set flags on the data, such as to vary the state of the context menu items (e.g., set corresponding checkboxes, or gray out the item). The shared methods handle the generation of the structures and the interaction with the host program, which significantly reduces the complexity of each node, as it only has to provide the static data structure and code to set the flags for the current state. Because the static data structure is defined for each node using only very simple declarations, context menus can be quickly produced for a large number of nodes.

Other advantages will become apparent from the following detailed description when taken in conjunction with the drawings, in which:

DETAILED DESCRIPTION

Exemplary Operating Environment

Figure 1:
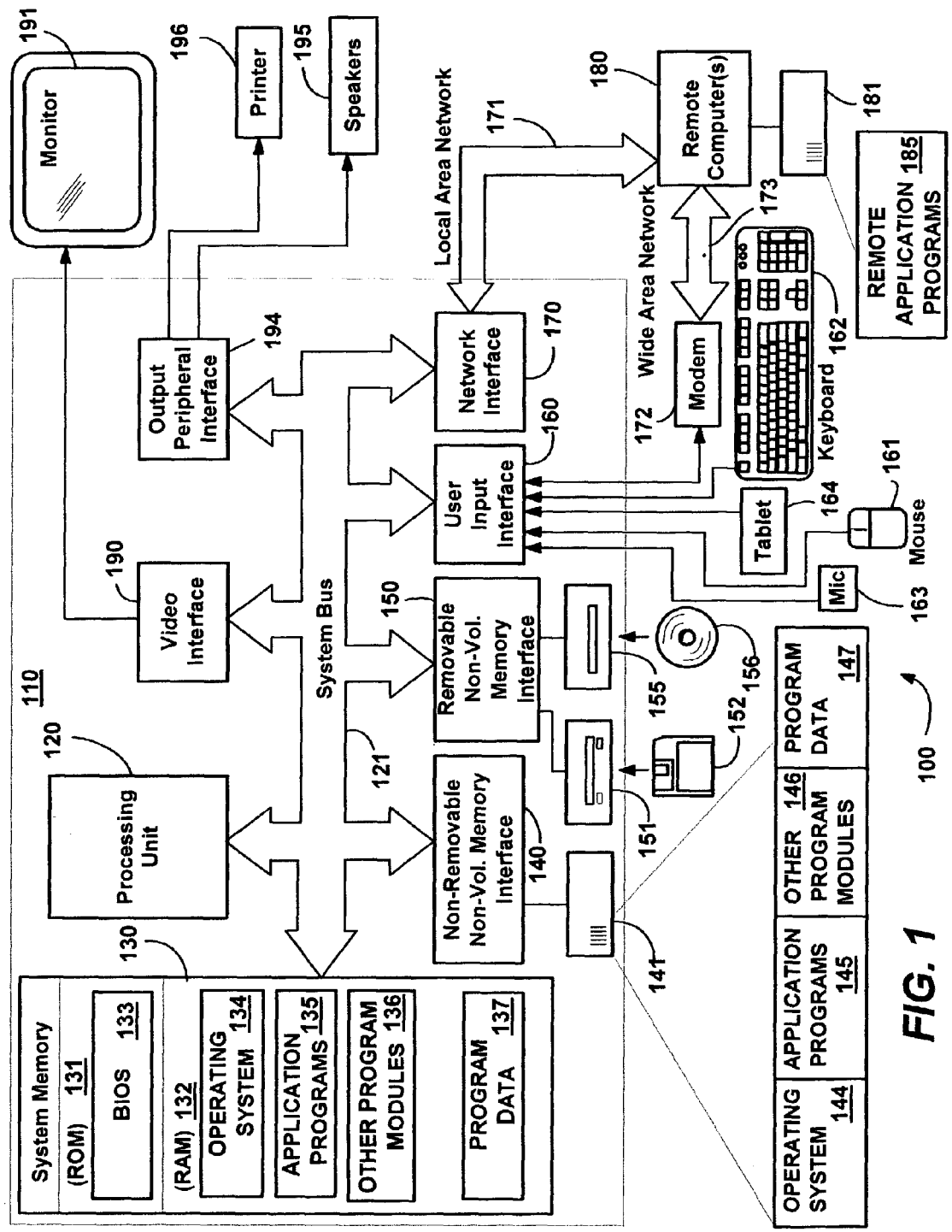
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Group Policy Objects

In general, the present invention provides a method and system for operating on policies implemented throughout a network, wherein those policies are defined and arranged (e.g., by one or more administrators) into group policy objects. Group policy objects generally comprise a collection of files, objects and attributes that exist at various locations in the network. Such policy may correspond to policy settings in the group policy objects, including registry-based settings, scripts, (computer startup and shutdown scripts, and user logon and logoff scripts), redirection of folders that contain user documents and settings, application deployment (software installation), security settings, public key policy settings, software restriction policies, IP security, remote installation services, and/or Internet Explorer Maintenance. Indeed, group policy objects may be extended to include virtually any desired information, as long as a client-side (or other) extension that uses the policy object is capable of interpreting and/or handling the information therein.

In an example implementation described herein, the system and method of operating on group policy utilize a highly flexible architecture of the Microsoft Windows® operating system, in which an administrator links the group policy objects to the containers, which comprise hierarchically organized directory objects representing sites, domains and organizational units, with policy recipients (e.g., users and computers) being associated with those containers. In this implementation, generally represented in FIG. 2, the group policy objects preferably utilize a Windows® directory service (e.g., in components 201 and 202), known as Active Directory®, which stores information about the objects of a domain, and makes this information easy for administrators to access, find and apply via a single, consistent and open set of interfaces. Note that each domain controller has a directory service component, with data replicated to other directory service components, but for purposes of the examples the directory service will be described with reference to the directory service component 202. Thus, for example, with the Active Directory® service 202, administrators can access resources anywhere on the network. Similarly, administrators have a single point of administration for the objects on the network, which can be viewed in a hierarchical structure. Each domain controller also has a sysvol component that is similarly replicated, typically for maintaining larger sets of data (relative to the size of the sets of data in the directory service). Note that for purposes of explanation herein, the user performing such group policy object-related tasks will be referred to as an administrator, although it is understood that any user with appropriate security privileges can perform these tasks, even if not actually designated as an administrator.

Figure 2:
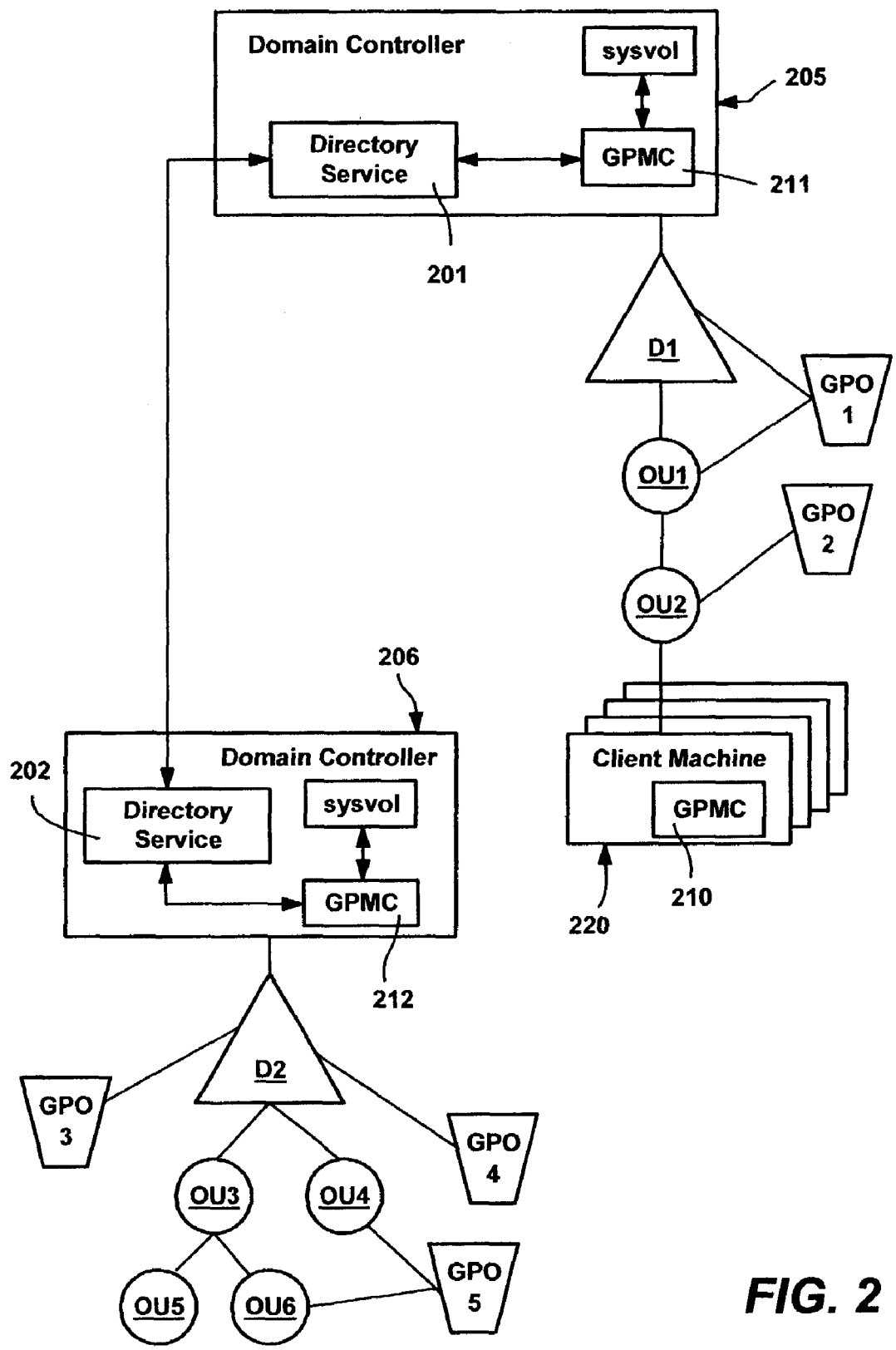
FIG. 2 is a block diagram generally representing a network including a directory service and domain controllers with group policy objects capable of being operated on in accordance with an aspect of the present invention.
Figure 3:
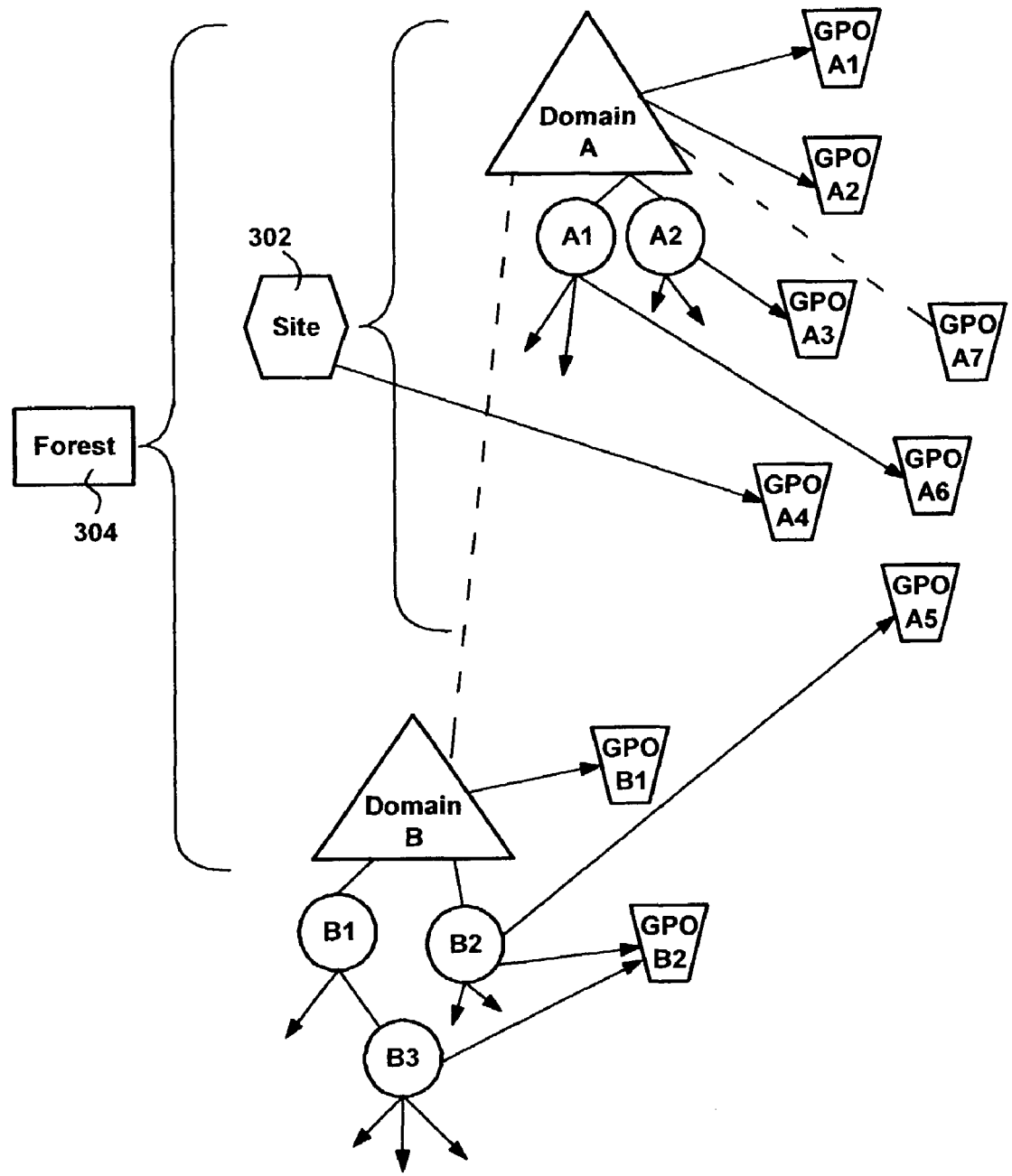
FIG. 3 is a representation of a forest, site, domains and organizational units in network with associated group policy objects capable of being operated on in accordance with an aspect of the present invention.

A core unit in the Active Directory® service is a domain, shown via domains D1 and D2 in FIG. 2, which are each controlled by one or more domain controllers, shown as the domain controller 205 and the domain controller 206, respectively. Note that there may be more than one domain controller per domain. Many of the objects of a network exist within a domain. As generally represented in FIG. 3, a single domain can span multiple physical locations or sites (e.g., 302), and domains can be grouped together into a forest 304, typically in some logical grouping as determined by an administrator. A site 302 comprises one or more ranges of IP addresses of which computers can be a member, often a grouping of computers related by some geographical area.

Organizational units (e.g., OU1-OU6 in FIG. 2) are a type of directory object included within domains that are hierarchically organized logical containers into which users, groups, computers, and even other organizational units may be logically placed. Group policy objects e.g., GP1-GP5 in FIG. 2) are stored in (exist in) a domain, and can be applied to one or more sites, domains, and/or organizational units. Note that a site, domain, and/or organizational unit may be referred to as a scope of management, or SOM. It will be readily appreciated that although described herein with reference to Microsoft Windows®, the Active Directory® service, sites, domains, organizational units, and so forth, the present invention is not limited thereto, nor even to directory containers in general, but rather is applicable to any types of policy objects and/or scoping mechanisms that require management in a network.

To apply policy to policy recipients (users and machines) of the network, group policy objects may be created via a group policy management console (e.g., 210, 211 or 212 in FIG. 2), or similar program with a suitable user and/or programmatic interface. Note that as represented in FIG. 2, an instance of the group policy management console may be run from essentially any machine in the network that is capable of running a management program, including client machines (e.g., 220) or the domain controllers 205 and 206. Once created, group policy objects may then be linked to an appropriate container or containers (e.g., objects representing a scope of management, such as sites, domains and organizational units) that are arranged in a hierarchy with which the policy recipients are associated. For example, any group policy management console 210, 211, 212 or similar user interface tool allows administrators to selectively associate the group policy objects GPO1 and GPO2 with directory container objects D1, OU1 and OU2 in FIG. 2. Note that as represented by the dashed line from Domain A to the group policy object GPOA7 in FIG. 3, a group policy object may exist in a domain but not be linked to a container.

Each group policy object (e.g., GPO3 of FIG. 2) may be composed of group policy information maintained in many locations in the network, including objects and attributes stored in the Active Directory® service 202, and collections of system volume (sysvol) files, wherein the sysvol comprises a folder on a domain controller (e.g., 206), such as used to replicate file-based data among domain controllers. The policy information may include one or more pointers to another location (e.g., a data file on a remote share) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Because many group policy objects can apply to one policy recipient, such as via a domain association or one or more organizational units to which the policy recipient belongs, for each policy recipient, the policy settings maintained in the policy objects may be selectively accumulated in an order of precedence, inherited from the group policy objects associated with one or more higher-up organizational units, a site, and/or the domain, and/or blocked from being inherited. In general, to accumulate policy for a policy recipient, policies are applied in a manner such higher policies that are enforced take precedence by hierarchical order, while higher non-enforced policies may be overridden by lower-level policies.

User Interface Support Mechanisms

In general, in one implementation the present invention is incorporated into a group policy management console, which provides a mechanism for representing and managing group policy topology and relationships among various aspects of group policy data. The group policy management console is essentially a management tool, and can be implemented as a module referred to as a snap-in, that is hosted as a console by the Microsoft® Management Console (MMC).

The group policy management console 212 provides group policy representation and management functionality in a number of ways, including by providing a user interface and underlying logic for managing group policy across multiple domains, sites, and forests. For example, from a single unified view, an administrator can view, manage, and search across domains, sites, and forests, copy and import data to group policy objects across domains and forests, and so forth.

Figure 4:
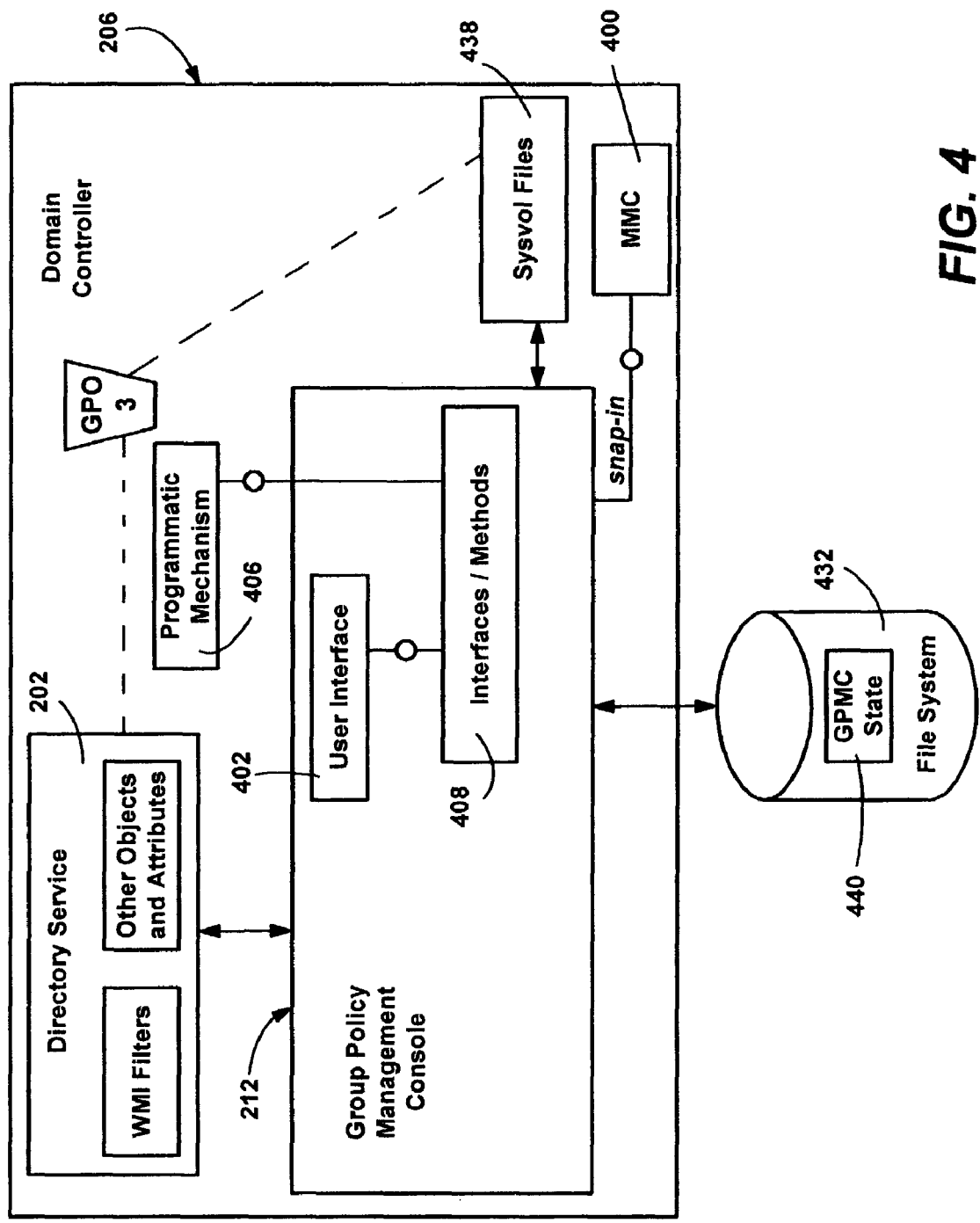
FIG. 4 is a block diagram generally representing components of the group policy management console and related components in accordance with an aspect of the present invention.

FIG. 4 is a block diagram generally representing example components for performing various aspects of the present invention when implemented on a computer system, such as the domain controller 206 (FIG. 2). In this example implementation, the group policy management console 212 is a snap-in to the Microsoft® Management Console (MMC) 400. The MMC 400 and its use of such snap-ins is well-known, and is not described in detail herein, other than to note that the group policy management console 212 complies with the requirements of the MMC 400 for snap-ins. However, as described below, the group policy management console 212 provides a number of innovations, features, functionality and similar advantages that are not found in other known snap-ins.

As represented in FIG. 4, a user interface 402 and/or a programmatic mechanism (e.g., script or other external program) 406 connect to the interfaces and methods 408, such as described in the aforementioned patent application entitled "Interfaces and Methods for Group Policy Management." Although other user interfaces can similarly connect to the group policy management console 212, the user interface 402 is configured in accordance with and supported by various aspects of the present invention, and thus is a preferred user interface, which in one implementation is provided as part of the overall group policy management console technology.

In general, the group policy management console 212/user interface 402 provide a number of group policy-related management services, by accessing the directory service 202 and/or sysvol files 438 that make up the group policy objects of a domain. Also, as represented in FIG. 4, the group policy management console 212 is able to access a file system 432 or the like in which various group policy management console state data 440, such as selections made via the user interface 402, can be persisted. For example, this allows administrator choices, settings and so forth to be preserved for the next time that the administrator runs the group policy management console 212.

Consistent with MMC, the user interface 402 presents data to the user in a treeview area 502 and a result pane area 504, as further described in the aforementioned patent application entitled "Method and System for Representing Group Policy Object Topology and Relationships." In general, user selections on objects represented in the treeview area 502 result in access to data of the object via a MMC-provided content in the result pane area 504. For example, the administrator may navigate to an item in the treeview area 502, and be presented with corresponding data of that item. However, note that the group policy management console provides a customized result pane area that provides a richer display than a standard list view, as described in the aforementioned patent application entitled "Method and System for Representing Group Policy Object Topology and Relationships."

One of the things that the administrator can do is issue commands (or methods) related to the items. For example, the administrator can navigate to an item in the treeview area 502, and obtain a context menu of commands such as by right-clicking or pressing shift-F10 (the accessible shortcut for activating a context menu). A currently selected command may be displayed in a display area 508 of the user interface.

Because each snap-in is essentially customized for a particular purpose, yet some commands such as help are common to any tool, the context menus are a combination of MMC- and other mechanism-provided commands that are common, and snap-in supplied commands that provide the specific functions that are needed based on the context in which the snap-in tool is operating (e.g., the node that is selected) when a context menu is invoked. To provide these context menus, the MMC notifies the hosted snap-in when a context menu is needed, and the snap-in calls back to the MMC with various data for each command, one at a time, with the data properly structured, including the text to display on the menu for that command, a command code, flags such as indicating how to display the command, and location information that indicates where the command should be displayed relative to others. In this manner, the appropriate context menu is appropriately built up whenever needed.

While this manner of building up a context menu as needed works reasonably well, the code that is required to structure the data to meet the requirements of the MMC is complex and relatively large. This is not a problem for snap-ins in which only a few context menus are needed, as the developer will simply add the customized code that is needed to each base class that will provide a context menu. However, with group policy management, there are many types of different nodes that each require a context menu that is specific to that type of node. As such, while it is possible to include the necessary custom code in each node, it is highly inefficient and complex to do so.

Figure 6:
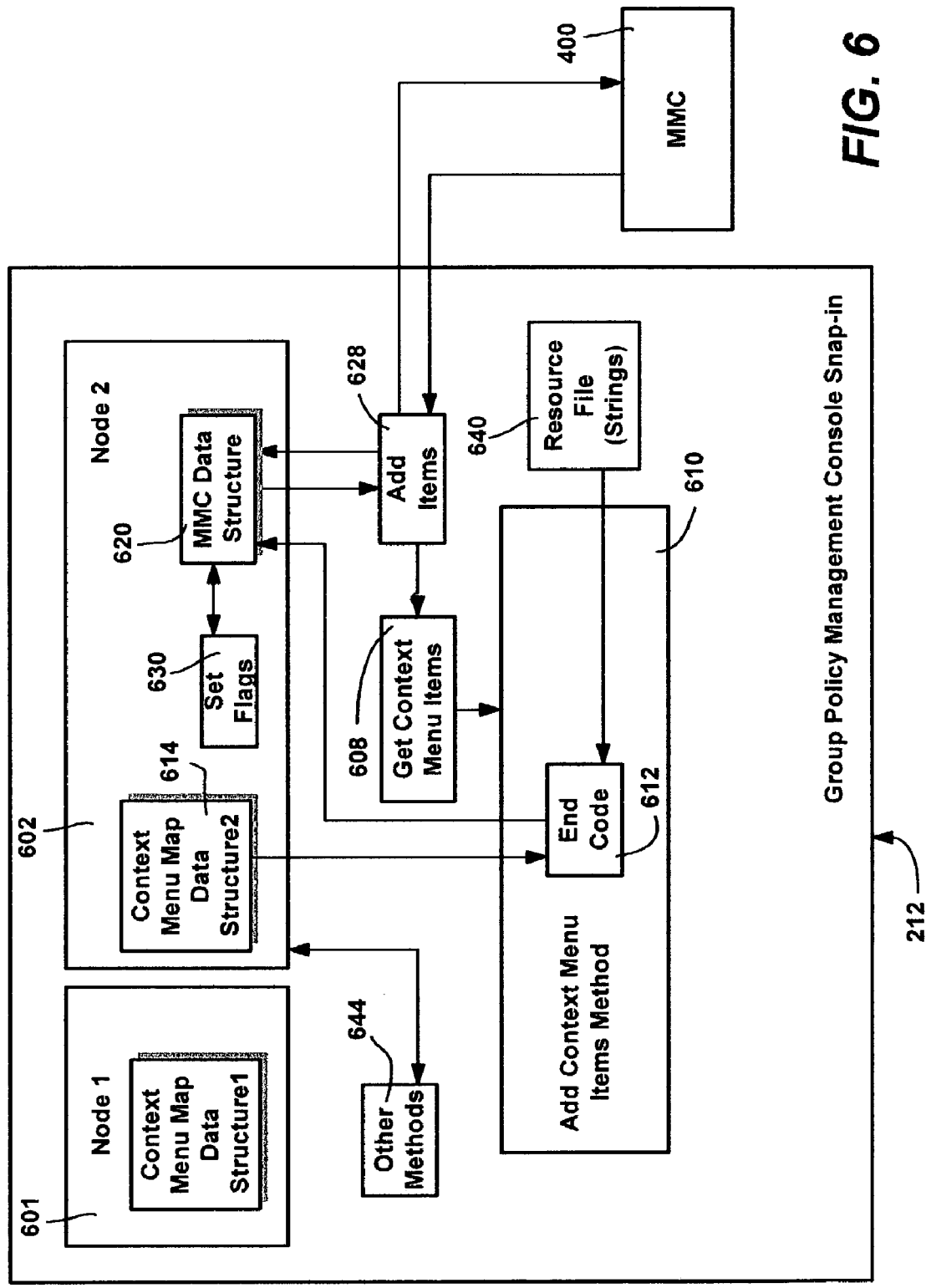
FIG. 6 is a block diagram generally representing components and data structures used to generating a context menu generated from a context menu map in accordance with an aspect of the present invention.

In accordance with an aspect of the present invention, there is provided a mechanism that allows the nodes to generate a customized context menu per node type using only a simple context menu map (supplied by the developer), in conjunction with straightforward macro declarations and appropriate parameters. The context menu map allows the developer to specify the context menu items that should appear for a given node using only high-level macros and string identifiers. The macros define methods and a specific data structure 614 (FIG. 6, described below), which when called with additional methods in the base class 628, produce the final context menu. The methods in the base class 628 are not specific to any particular node type, that is, they are generic to nodes, and can thereby be defined in a base class. The specific data structure 614 is used because it allows the developer to more easily use macros to define the context menu map. As generally represented in FIG. 6, when the group policy management console snap-in 212 is loaded, the specific data structures 614 (that were defined by the macros) are created in memory. When the MMC 400 requests a context menu, this data structure is transformed into a form 620 that can be understood by the MMC 400. As described below, this transformation only happens the first time a context menu is displayed.

The following is a simplified example context menu map:

```
BEGIN_CONTEXTMENU_MAP( )
    TOP_CONTEXTMENU_ENTRY(IDS_CREATEANDLINKGPOCONTEXT,
    IDS_CREATEANDLINKGPOCONTEXTDESC, CREATEANDLINKGPO_COMMAND,
    L"Create and link GPO")
END_CONTEXTMENU_MAP( )
```

Figure 5:
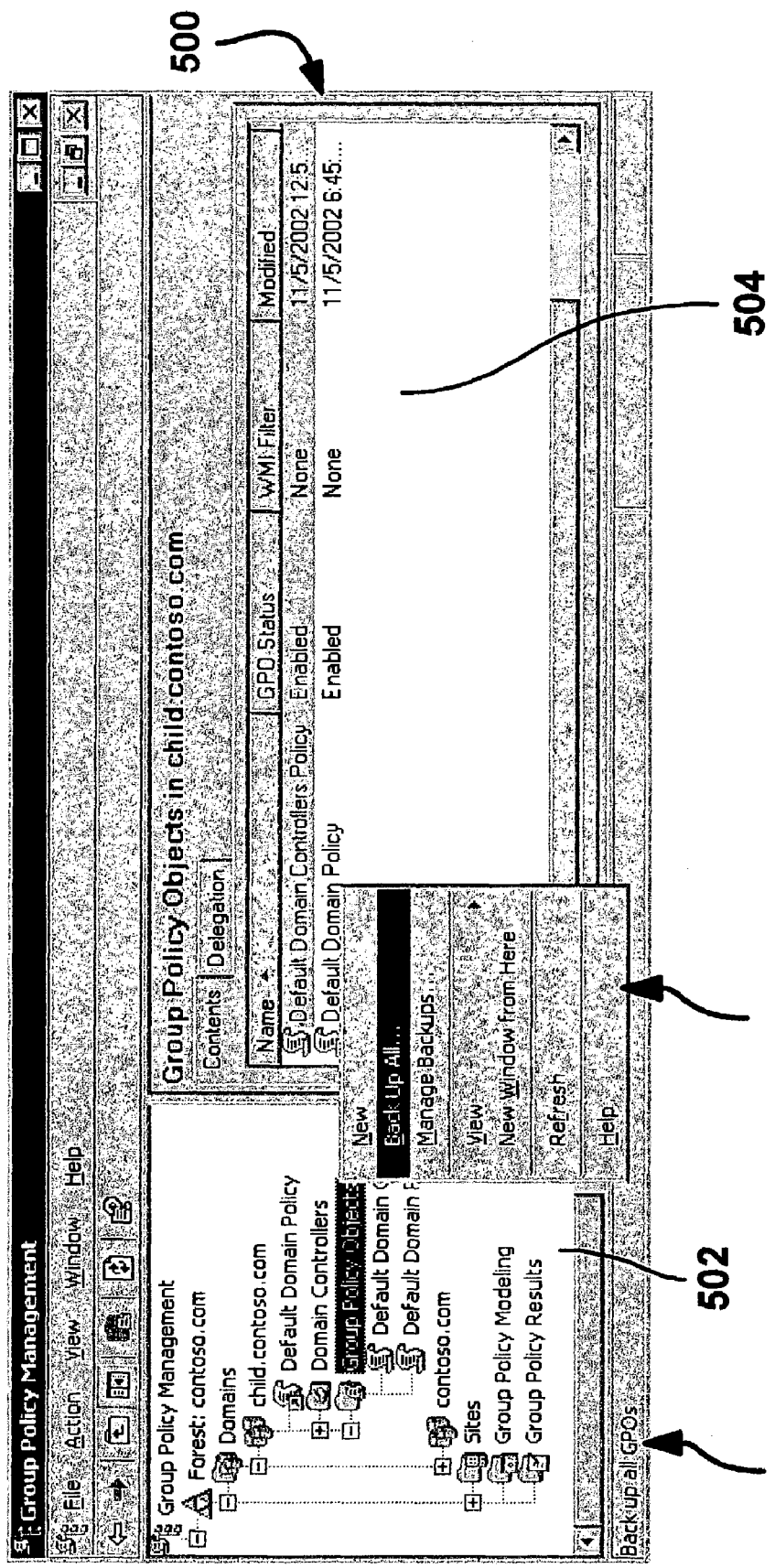
FIG. 5 is a representation of a user interface display showing a context menu generated from a context menu map in accordance with an aspect of the present invention.

The above example context menu map, as represented at node 601, causes a single context menu command (directed to a command to create and link a group policy object) to appear at the top of a corresponding context menu. Further menu items may be added by putting similar statements between the begin and end declarations. Note that MMC adds its own general commands (e.g., "New Window from Here") to the context menu, as represented in the context menu 506 of user interface 500 shown in FIG. 5, and other mechanisms can add common verbs such as "Refresh."

A simple example of the base context map is defined in the same way:

```
BEGIN_CONTEXTMENU_MAP( )
    VIEW_CONTEXTMENU_ENTRY(IDS_OPTIONSCONTEXT,
    IDS_OPTIONSCONTEXTDESC, OPTIONS_COMMAND, L"Options")
END_CONTEXTMENU_MAP( )
```

Figure 7:
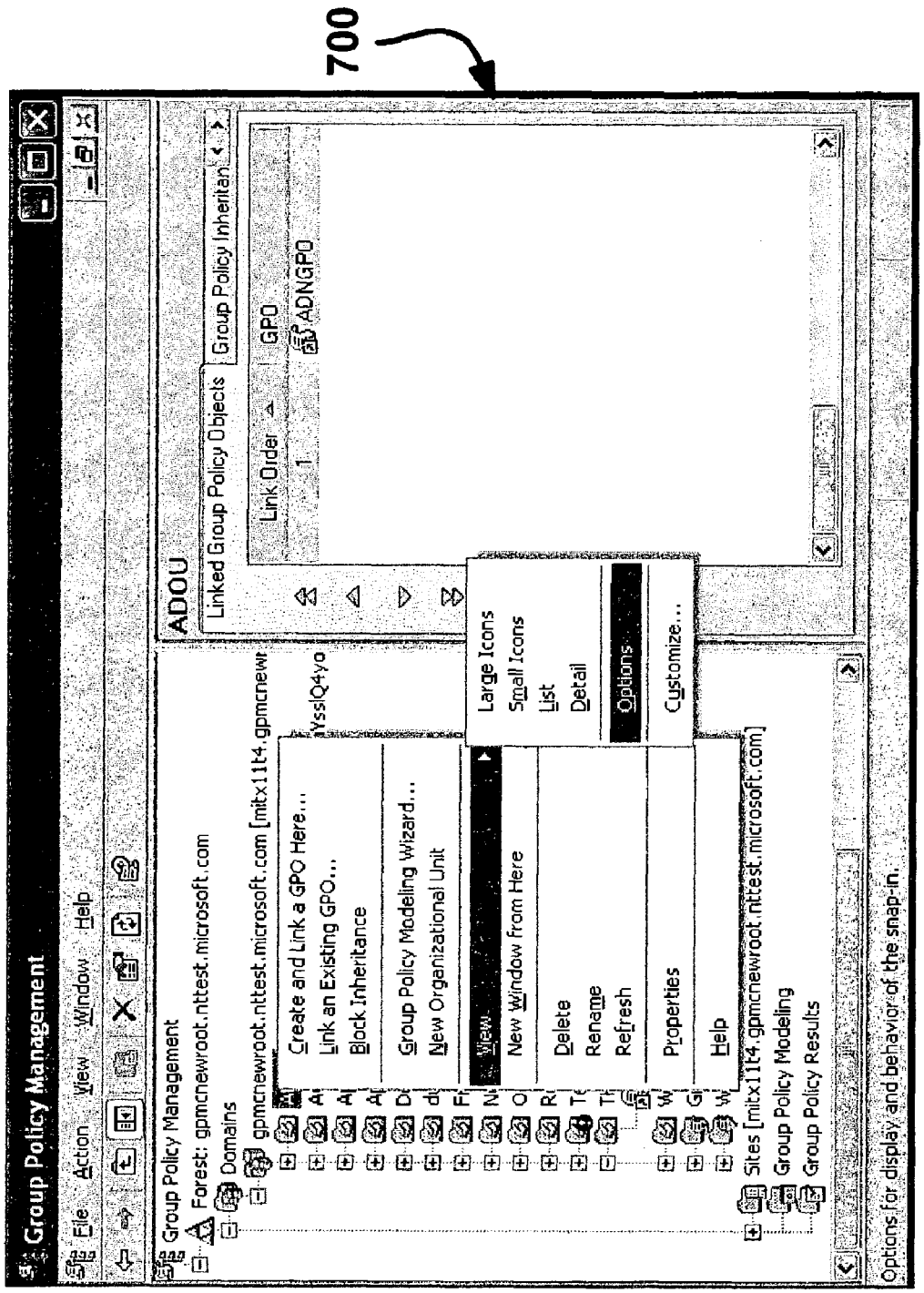
FIG. 7 is a representation of a user interface display showing another context menu generated in accordance with an aspect of the present invention.

The above example defined in the base class implementation (CDelegationBase) causes an additional command to be added to all context menus (in the "View" menu section of the context menu), as generally represented in the screen image 700 of FIG. 7.

The declarations in the above example header file make use of the following macros:

```
#define BEGIN_CONTEXTMENU_MAP( ) \
    public: \
        virtual CONTEXTMENUITEM2* GetContextMenuItems( ) \
        { \
            if (m_pMenuItems == NULL) \
            { \
                AddContextMenuItems( ); \
                CDelegationBase::AddContextMenuItems( ); \
            } \
            return m_pMenuItems; \
        } \
        void AddContextMenuItems( ) \
        { \
            static CONTEXTMENUINFO pContextMenuInfo[] = \
            {
#define TOP_CONTEXTMENU_ENTRY(MenuTextID, MenuDescriptionID, CommandID, LangIndependentName) \
                {MenuTextID, MenuDescriptionID, CommandID, CCM_INSERTIONPOINTID_PRIMARY_TOP, 0, 0, LangIndependentName},
#define END_CONTEXTMENU_MAP( ) \
                {0, 0, 0, 0, 0, 0, NULL} \
            }; \
            { \
                CONTEXTMENUITEM2* pOldItems = m_pMenuItems; \
                m_pMenuItems = new CONTEXTMENUITEM2[sizeof(pContextMenuInfo)/sizeof(pContextMenuInfo[0]) + m_cMenuItems]; \
                ZeroMemory ((void*) m_pMenuItems, (sizeof(pContextMenuInfo)/sizeof(pContextMenuInfo[0]) + m_cMenuItems)*sizeof(CONTEXTMENUITEM2)); \
                if (m_cMenuItems) \
                    CopyMemory(m_pMenuItems, pOldItems, m_cMenuItems*sizeof(CONTEXTMENUITEM2)); \
                delete pOldItems; \
            } \
            for (int indexContextMenuInfo = 0; pContextMenuInfo[indexContextMenuInfo].m_MenuTextID != 0 || pcontextMenuInfo[indexContextMenuInfo].m_Flags == MF_SEPARATOR; indexContextMenuInfo++) \
            { \
                int index = m_cMenuItems + indexContextMenuInfo; \
                m_pMenuItems[index].strName = new wchar_t[MAX_PATH]; \
                LoadString(_Module.GetModuleInstance( ), pContextMenuInfo[indexContextMenuInfo].m_MenuTextID, m_pMenuItems[index].strName MAX_PATH); \
                m_pMenuItems[index].strStatusBarText = new wchar_t[MAX_PATH]; \
                LoadString(_Module.GetModuleInstance( ), pContextMenuInfo[indexContextMenuInfo].m_MenuDescriptionID, m_pMenuItems[index].strStatusBarText, MAX_PATH); \
                m_pMenuItems[index].lCommandID = pContextMenuInfo[indexContextMenuInfo].m_CommandID; \
                m_pMenuItems[index].lInsertionPointID = pContextMenuInfo[indexContextMenuInfo].m_InsertionPointID; \
                m_pMenuItems[index].fFlags = pContextMenuInfo[indexContextMenuInfo].m_Flags; \
                m_pMenuItems[index].fSpecialFlags = pContextMenuInfo[indexContextMenuInfo].m_SpecialFlags; \
                m_pMenuItems[index].strLanguageIndependentName = pContextMenuInfo[indexContextMenuInfo].m_LangIndependentName; \
            } \
            m_cMenuItems += indexContextMenuInfo; \
        }
```

The base class from which the tree nodes derive comprise templates, and contains the following code that defines a structure, a count and a pointer that are used by the macros, and also sets up the base context menu map for the "Options" menu item which is on the view menu (the area below the top-level menu on the context menu):

```
typedef struct
{
    long m_MenuTextID;
    long m_MenuDescriptionID;
    long m_CommandID;
```

-continued

```
        long m_InsertionPointID;
        long m_Flags;
        long m_SpecialFlags;
        LPWSTR m_LangIndependentName;
    } CONTEXTMENUINFO;
    CONTEXTMENUITEM2* m_pMenuItems;
    int m_cMenuItems;
    BEGIN_CONTEXTMENU_MAP( )
        VIEW_CONTEXTMENU_ENTRY (IDS_
        OPTIONSCONTEXT, IDS_OPTIONSCONTEXTDESC,
OPTIONS_COMMAND, L"Options")
    END_CONTEXTMENU_MAP( )
```

As can be seen from the above examples, the macros include a begin macro (named BEGIN_CONTEXTMENU_MAP) and an end macro (END_CONTEXTMENU_MAP). The BEGIN_CONTEXTMENU_MAP defines two methods in the class. The first method is GetContextMenuItems 608, which when executed, first checks to see if the context menu items have been previously obtained. If not, another method is called, AddContextMenuItems 610, to add the context menu items declared in this class. The GetContextMenuItems 608 method then calls the base class to add (via the same AddContextMenuItems method in the base class) its menu items, e.g., a view-related entry. Note that the AddContextMenuItems method 610 is only partially defined, and ends abruptly after just beginning the declaration of a static data structure.

The various CONTEXTMENU_ENTRY declarations such as TOP_CONTEXTMENU_ENTRY each add an item to the static data structure that was started earlier. In one implementation, there are a number of such declarations, including the TOP_CONTEXTMENU_ENTRY macro, as set forth in the table below:

Simply by the developer selecting and ordering these declarations in the context menu map with appropriate values for the parameters and flags, a node can have a context menu map generated therefor.

After the declarations in the context menu map have been processed into menu-item data in the static structure, the end code 612 corresponding to the END_CONTEXTMENU_MAP macro then terminates the static structure with a valid and final entry that is marked with zero values, so that later processing will know when the end of the structure is encountered. The end code 612 then finishes the definition of the AddContextMenuItems method 610, which when executed will iterate through the static structure 614 and copy the entries to another structure 620 defined by the MMC 400, named CONTEXTMENUITEM2. The end code 612 does this by first reallocating the structure to a larger size, copying over the old items and then copying the new items. Note that the new items were the ones declared directly in this class, which need some translation before they can be copied over. This involves loading the actual strings from a resource file 640 (since the various CONTEXTMENU_ENTRY macros only used string resource identifiers).

When the MMC 400 calls to display a context menu for a node, the GetContextMenuItems method 608 is called, which in turn returns an MMC structure 620, either one that was maintained form a previous call, or if this is the first call for the MMC structure, after constructing an appropriate MMC structure 620. This happens in the AddMenuItems method 628, which is can be thought of as where the MMC 400 calls to request menu items, including providing flags that specify which menu items are allowed.

In general, the AddMenuItems method 628 loops through the master list of possible context menu items 620 (received via the call to GetContextMenuItems) and subjects each entry to a number of "if" statements in the code to determine whether that entry matches the requirements specified by the MMC 400. The following table shows the AddMenuItems method:

```
#define CUSTOM_CONTEXTMENU_ENTRY(MenuTextID, MenuDescriptionID,
CommandID, InsertionID, LangIndependentName) \
            {MenuTextID, MenuDescriptionID, CommandID, InsertionID,
0, 0, LangIndependentName},
#define TOPPOPUP_CONTEXTMENU_ENTRY(MenuTextID, MenuDescriptionID,
CommandID, LangIndependentName) \
            {MenuTextID, MenuDescriptionID, CommandID,
CCM_INSERTIONPOINTID_PRIMARY_TOP, MF_POPUP, CCM_SPECIAL_SUBMENU,
LangIndependentName},
#define TOP_CONTEXTMENU_ENTRY(MenuTextID, MenuDescriptionID, CommandID,
LangIndependentName) \
            {MenuTextID, MenuDescriptionID, CommandID,
CCM_INSERTIONPOINTID_PRIMARY_TOP, 0, 0, LangIndependentNarne},
#define NEW_CONTEXTMENU_ENTRY(MenuTextID, MenuDescriptionID, CommandID,
LangIndependentName) \
            {MenuTextID, MenuDescriptionID, CommandID,
CCM_INSERTIONPOINTID_PRIMARY_NEW, 0, 0, LangIndependentName},
#define TASK_CONTEXTMENU_ENTRY(MenuTextID, MenuDescriptionID, CommandID,
LangIndependentName) \
            {MenuTextID, MenuDescriptionID, CommandID,
CCM_INSERTIONPOINTID_PRIMARY_TASK, 0, 0, LangIndependentName),
#define VIEW_CONTEXTMENU_ENTRY(MenuTextID, MenuDescriptionID, CommandID,
LangIndependentName) \
            {MenuTextID, MenuDescriptionID, CommandID,
CCM_INSERTIONPOINTID_PRIMARY_VIEW, 0, 0, LangIndependentName},
```

```
template <class T>
HRESULT CDelegationImpl<T>::AddMenuItems(LPCONTEXTMENUCALLBACK
piCallback, long *pInsertionAllowed, bool fComponent)
{
    try
    {
        CWaitCursor wc;
        HRESULT hr         = E_FAIL;
        CComQIPtr<IContextMenuCallback2> spCallback2 = piCallback;
        if (!spCallback2)
            throw E_INVALIDARG;
        // Loop through and add each of the menu items
    for (LPCONTEXTMENUITEM2 m = GetContextMenuItems( ); m->strName; m++)
        {
            // view items are only allowed from Component
            // do all the rest from the ComponentData
            if (m->lInsertionPointID ==
CCM_INSERTIONPOINTID_PRIMARY_VIEW)
            { // view items
                if (!fComponent)
                    continue;
            }
            else
            { // all other items
                if (fComponent)
                    continue;
            }
            if ((((*pInsertionAllowed & CCM_INSERTIONALLOWED_TOP) &&
                    !(m->lInsertionPointID ==
CCM_INSERTIONPOINTID_PRIMARY_NEW) &&
                    !(m->lInsertionPointID ==
CCM_INSERTIONPOINTID_PRIMARY_TASK) &&
                    !(m->lInsertionPointID ==
CCM_INSERTIONPOINTID_PRIMARY_VIEW)) ||
                ((*pInsertionAllowed & CCM_INSERTIONALLOWED_NEW) &&
                    (m->lInsertionPointID ==
CCM_INSERTIONPOINTID_PRIMARY_NEW)) ||
                ((*pInsertionAllowed & CCM_INSERTIONALLOWED_TASK) &&
                    (m->lInsertionPointID ==
CCM_INSERTIONPOINTID_PRIMARY_TASK)) ||
                ((*pInsertionAllowed & CCM_INSERTIONALLOWED_VIEW) &&
                    (m->lInsertionPointID ==
CCM_INSERTIONPOINTID_PRIMARY_VIEW))
                )
            {
                hr = SetMenuItemFlags(m->lCommandID, &m->fFlags);
                if (IS_DC_UNAVAILABLE_ERROR(hr))
                {
                    return E_UNEXPECTED; // Do not display error message
                }
                if (S_GPMC_NOINSERT == hr)
                    continue;
                if (FAILED(hr))
                {
                    // Ignore failures and just show the context menu
                    m->fFlags &= ~MF_CHECKED;
                    m->fFlags &= ~MF_GRAYED;
                }
                hr = spCallback2->AddItem(m);
                if (FAILED(hr))
                {
                    // skip errors adding view items
                    throw hr;
                }
            }
        }
    }
    catch (HRESULT hrError)
    {
        DisplayGPMCError(hrError); // No return value
        return hrError;
    }
    return S_OK;
}
```

The above add items code 628 is shared by the nodes, again transferring complexity out of the nodes. The large "if" statement (with multiple AND and OR conditions), that is directed to whether insertion is allowed, essentially matches the item to what the MMC 400 has requested by filtering out what is and what is not allowed, as specified by the MMC 400 and the type of context menu item currently being iterated.

As can be seen from the example above, the add items method 628 also gives the actual node 602 a chance to modify the menu items' flags (e.g., for graying and checking), as represented in FIG. 6 by the set flags process 630 (described below), before sending the items to the MMC 400. Once done, the add items 628 method adds the allowed entry to the context menu that the MMC 400 is building (via a callback to the MMC method AddItem).

The set flags process 630 is node specific, and gives each node a chance to modify various flags of the context menu to reflect current state or other information. In general, The set flags code 630 gives each node type further control over how each context menu item is displayed, e.g., grayed out, not displayed, shown with a checkbox selected, and so forth. The following code is an example from the domain node of the set flags process 630 that sets the menu item flags, called as described above from the AddMenuItems method that is listed:

```
HRESULT CDomainNode::SetMenuItemFlags(long commandID, long
*pFlags)
{
    try
    {
        HRESULT hr = S_OK;
        bool bChecked = false;
        bool bGrayed = false;
        CComQIPtr<IGPMDomainInternal> spInternal;
        VARIANT_BOOL varBool;
        switch (commandID)
        {
        case CREATEANDLINKGPO_COMMAND:
            // Check the domain for GPO creation permissions.
            spInternal = GetUnknown( );
            if (!spInternal)
                throw E_NOINTERFACE;
            hr = spInternal->CheckPermission(permSOMGPOCreate,
&varBool);
            if (FAILED(hr))
            {
                if (IS_DC_UNAVAILABLE_ERROR(hr))
                    throw hr;
                else
                    varBool = VARIANT_TRUE;
            }
            if (VARIANT_FALSE == varBool)
            {
                bGrayed = true;
                break;
            }
            // Fall through to check for link perms also.
        case LINKGPO_COMMAND:
            // Check the SOM for link permissions.
            spInternal = GetUnknown( );
            if (!spInternal)
                throw E_NOINTERFACE;
            hr = spInternal->CheckPermission(permSOMLink,
&varBool);
            if (FAILED(hr))
            {
                if (IS_DC_UNAVAILABLE_ERROR(hr))
                    throw hr;
                else
                    varBool = VARIANT_TRUE;
            }
            if (VARIANT_FALSE == varBool)
                bGrayed = true;
            break;
        case BLOCKINHERITANCE_COMMAND:
            // Check the SOM for link permissions.
            spInternal = GetUnknown( );
```

-continued

```
            if (!spInternal)
                throw E_NOINTERFACE;
            hr = spInternal->CheckPermission(permSOMLink,
&varBool);
            if (FAILED(hr))
            {
                if (IS_DC_UNAVAILABLE_ERROR(hr))
                    throw hr;
                else
                    varBool = VARIANT_TRUE;
            }
            if (VARIANT_FALSE == varBool)
                bGrayed = true;
            // Also check the blocking state.
            if (m_bBlocking)
                bChecked = true;
            break;
        case NEWOU_COMMAND:
            // Check the SOM for OU creation permissions.
            spInternal = GetUnknown( );
            if (!spInternal)
                throw E_NOINTERFACE;
            hr = spInternal-
>CheckPermission((GPMPermissionType)permSOMOUCreate,
&varBool);
            if (FAILED(hr))
            {
                if (IS_DC_UNAVAILABLE_ERROR(hr))
                    throw hr;
                else
                    varBool = VARIANT_TRUE;
            }
            if (VARIANT_FALSE == varBool)
                bGrayed = true;
            break;
        case PLANNINGWIZARD_COMMAND:
            // Check if it is dotnet domain
            if (!(GetForestNodeParent( )->GetForestDotNetFlag( )))
                return S_GPMC_NOINSERT;
            // Check the SOM for planning permissions.
            spInternal = GetUnknown( );
            if (!spInternal)
                throw E_NOINTERFACE;
            hr = spInternal->CheckPermission(permSOMPlanning,
&varBool);
            if (FAILED(hr))
            {
                if (IS_DC_UNAVAILABLE_ERROR(hr))
                    throw hr;
                else
                    varBool = VARIANT_TRUE;
            }
            if (VARIANT_FALSE == varBool)
                bGrayed = true;
            break;
        }
        if (bChecked)
            *pFlags |= MF_CHECKED;
        else
            *pFlags &= ~MF_CHECKED;
        if (bGrayed)
            *pFlags |= MF_GRAYED;
        else
            *pFlags &= ~MF_GRAYED;
    }
    catch (HRESULT hrError)
    {
        RemoveDomainIfUnavailable(hrError); // Ignore return value
        return hrError;
    }
    return S_OK;;
}
```

In addition to the begin macros, command-related macros, and end macros, other macros and methods 644 may be provided. For example, the following macro cleans up the memory allocated by the context menu map macros, e.g., for the data structure, and defines code that is called when the class that is using the context menu map is destructed:

```
#define CLEANUP_CONTEXTMENU_MAP( ) \
    { \
        if (m_pMenuItems != NULL) \
        { \
            for (int index = 0; m_pMenuItems[index].strName !=
NULL; index++) \
            { \
                delete [] m_pMenuItems[index].strName; \
                delete [] m_pMenuItems[index].strStatusBarText; \
            } \
            delete [] m_pMenuItems; \
        } \
    } \
```

Thus, via the context menu map as processed into a static structure that is used by the shared methods, the developer only needs to provide a simple set of declarations in the form of a context menu map with appropriate parameters to have a customized context menu produced for that node. The context menu map feature significantly reduces the complexity of each node.

Figure 8:
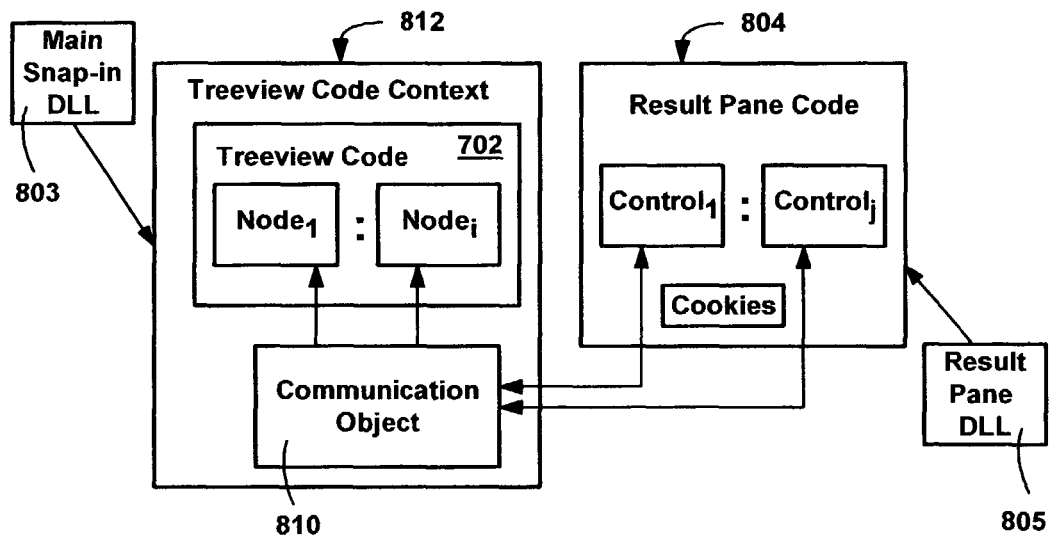
FIG. 8 is a block diagram generally representing a communications object that facilitates the separation of treeview and result pane components by enabling communication between those components in accordance with an aspect of the present invention.

In accordance with another aspect of the present invention, in one implementation there is provided a mechanism that facilitates the separation of the treeview portion of the main snap-in code 702 (comprising the nodes in the treeview) and the result pane user interface code 804 (comprising a number of custom controls such as ActiveX Controls®) into separate dynamic link libraries, or DLLs 803 and 805, respectively, as generally represented in FIG. 8. General relationships between the treeview 502 and result pane 504 (FIG. 5) with respect to performing various operations on the treeview nodes' data is further described in the aforementioned patent application entitled "Interfaces and Methods for Group Policy Management."

In MMC, each of the nodes in the treeview is identified by a cookie, which is actually a C++ pointer to an instantiated class, and which is only known about in the main snap-in (treeview) code DLL. In order to communicate between a given node the result pane controls and the treeview code 702, the cookie is needed to identify the particular node, such as to find an actual group policy object to which a link node is pointing. As mentioned above, however, the cookie is a pointer to a class that can in fact be directly used to call a method on the node class to obtain the needed information. However for various reasons, including reducing the number of couplings between the DLLs, the use of custom controls, and/or requiring the result pane DLL to have to know the full structure of the class to make such a call, the cookie should not be used by the result pane controls as such a pointer, but only as a cookie. This separation also provides a client-server like model for future design considerations, e.g., such as to implement the treeview via COM objects rather than C++ objects.

In accordance with an aspect of the present invention, to separate the treeview and result pane DLLs 803 and 805, respectively, yet allow communication between the treeview code 702 and the result pane code 804, a COM communication object 810 (e.g., CoCreated by the result pane DLL 805) is provided, through which the various result pane controls may request that the main MMC snap-in DLL treeview code 702 perform some action or return some information to the requesting control, using a cookie as an identifier. This communication object 810, sometimes referred to as a cookie cutter, runs in the context 812 of the main MMC snap-in (treeview) DLL but is created from the result pane DLL 805, and indirectly provides access to the methods of the nodes, that is, those methods that the result pane controls need to access to in order to perform some operation or receive some data from the node. For example, one method can be passed a cookie and/or a domain name to return domain information; a NULL cookie can be passed to return the domain that is associated with a domain name, or the cookie can be passed to return the domain.

Figure 9:
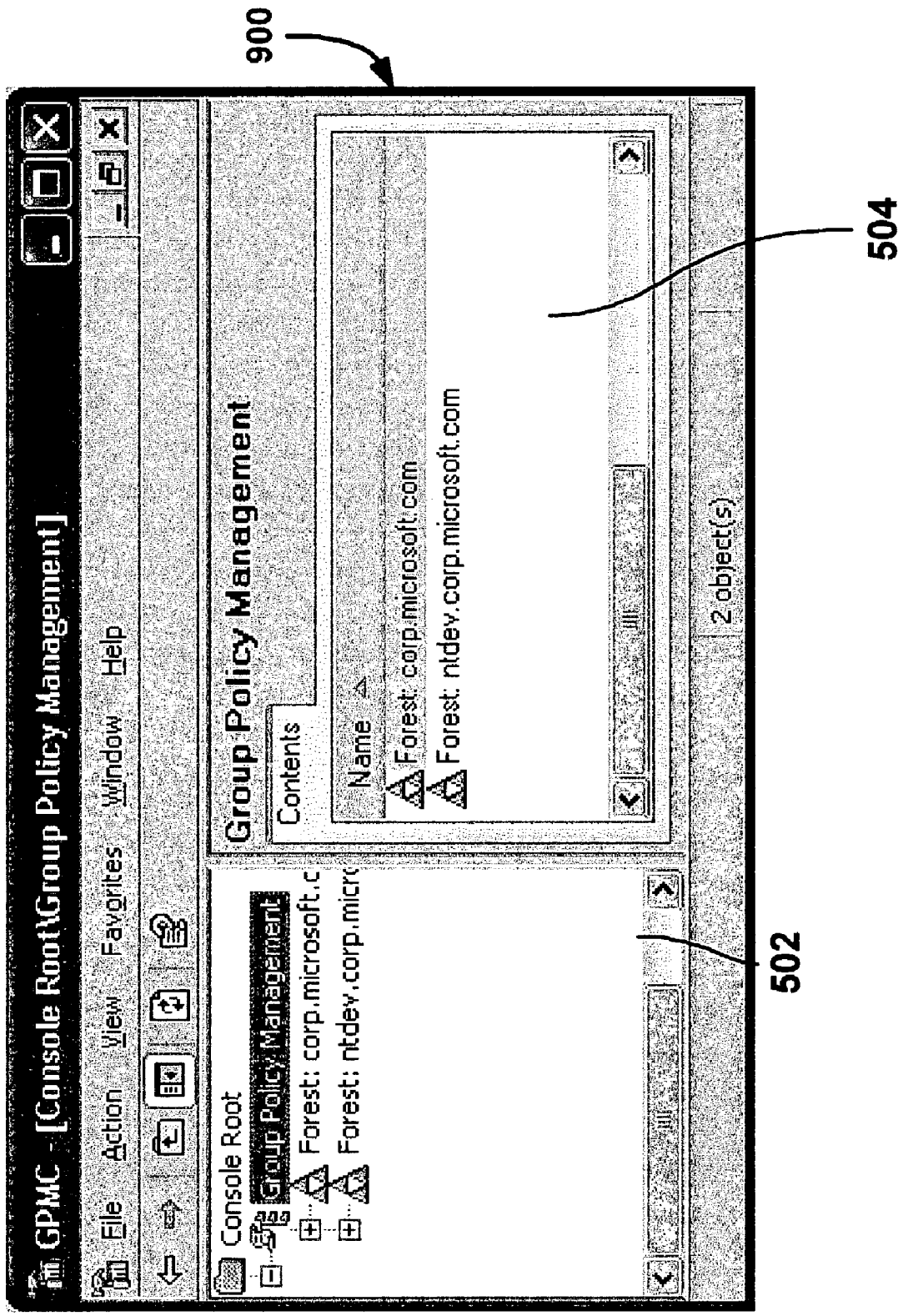
FIG. 9 is a representation of treeview and result pane display areas in which data for the result pane was obtained from the treeview component via communication through the communications object, in accordance with an aspect of the present invention.

By way of example, as represented in FIG. 9, the user interface display area 900 may display a forest collection contents page (also known as the contents page of the group policy management node) in the treeview area 502 to list each forest loaded into the console. For this forest collection contents page, the result pane area 504 essentially provides the same information, and thus needs the names and bitmaps from the treeview code 702. To this end, the result pane code 804 obtains a list of cookies that represent the forests, creates the COM communication object, and calls the GetDisplayName and GetBitmapIndex methods on the communication object for each cookie to obtain the names and bitmaps to actually display in the result pane area 505 of the contents page 900. The communication object 810 thus facilitates any needed data exchange between the custom controls that make up the result pane DLL 805 and the treeview DLL 803.

Figure 10:
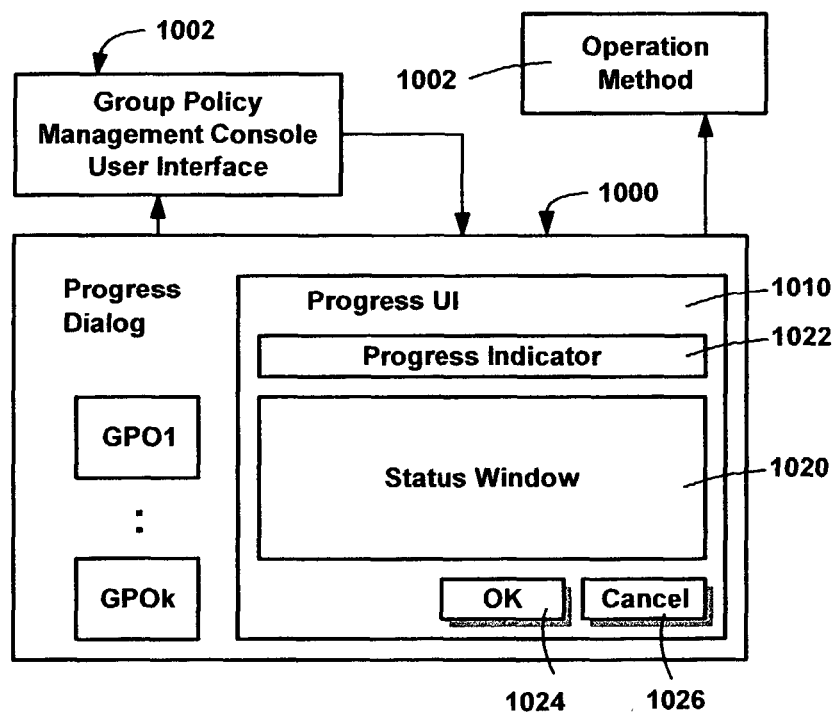
FIG. 10 is a block diagram representing a progress dialog that provides progress information while driving an management operation on one or more objects, in accordance with an aspect of the present invention.

In accordance with another aspect of the present invention, as generally represented in FIG. 10, a multiple-purpose progress dialog 1000 is provided, that is used in the group policy management console user interface in a number of situations. Generally, these situations are those directed towards group policy object operations that are relatively lengthy to perform from the administrator's perspective and that benefit from providing other feedback to the administrator, as well as the ability to cancel the operation if desired. Such operations include backup, copy, restore, import, link and/or delete of group policy objects, as further described in the aforementioned patent application entitled "Method and System for Implementing Group Policy Operations."

Figure 11:
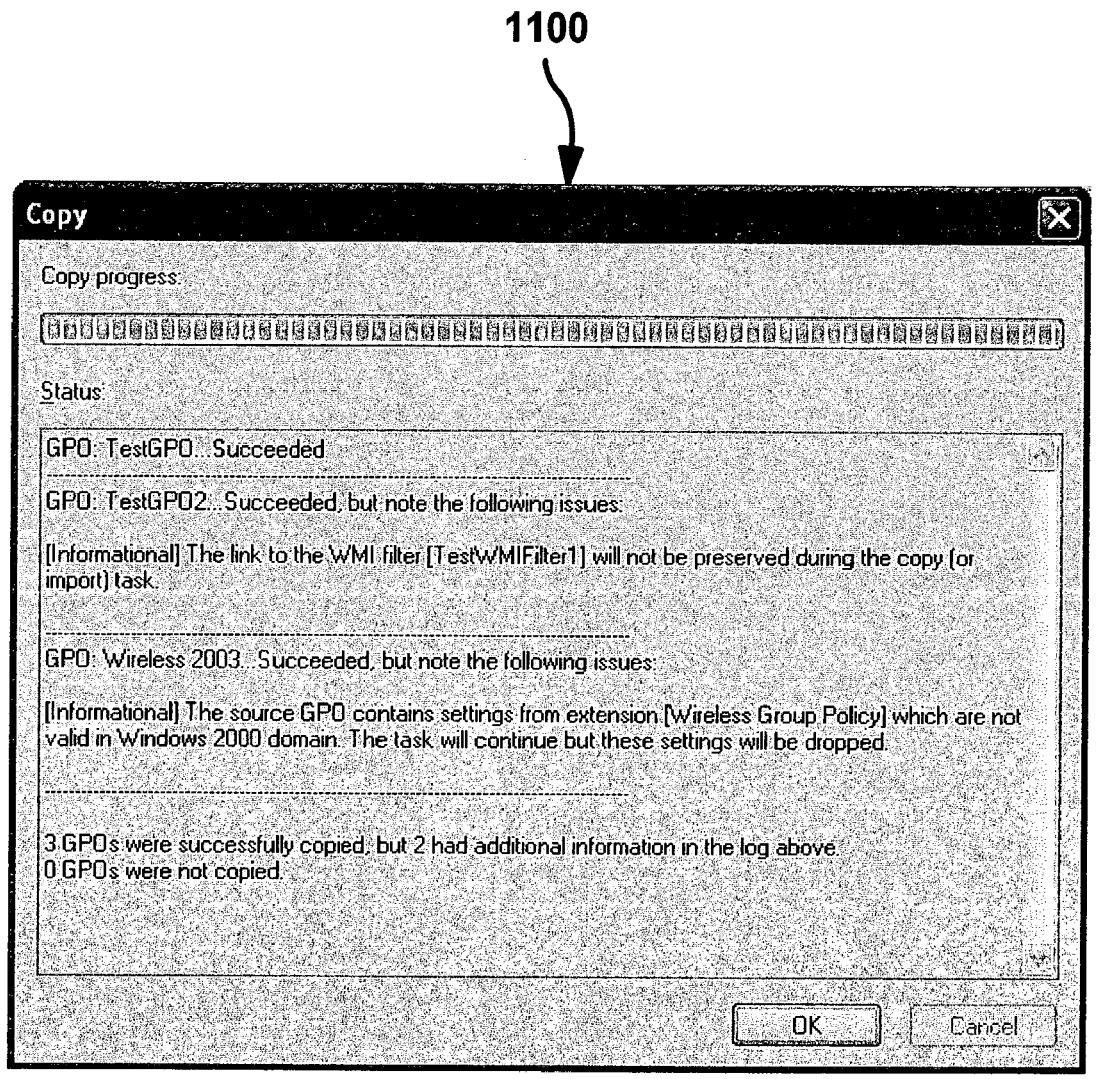
FIG. 11 is a representation of a progress dialog screenshot provided in accordance with an aspect of the present invention.

FIG. 11 shows an example progress dialog screenshot 1100. As can be seen via the status messages in the progress dialog screenshot 1100, three group policy objects have been copied at once, across domains.

The progress dialog 1000 (FIG. 10) comprises a combination container and user interface component 1002 that is created when needed by the group policy management console user interface 402 to perform an operation (or possibly a set of operations). Objects such as group policy objects that are involved in the operation are added to the progress dialog 1000 by the group policy management console user interface component 402, along with information as to the operation that is to be performed on that object (or objects). Note that the progress dialog 1000 can handle an operation on multiple objects, however the user interface 402 may limit this for other reasons, e.g., so that the administrator does not get confused.

To this end, in one implementation, when the progress dialog 1000 is first created, an Add method takes an IUnknown interface (as is known in COM object technology) of each object to be operated on, or a cookie, (but not both types at once), and calls the AddItem method of the object. Once the object or objects have been added to the progress dialog 1000, a specific method, generally represented by the operation method 1002 in FIG. 10, such as Copy or Backup, is called by the progress dialog 1000 to perform the operation. In other words, the progress dialog is called to initiate the operation, but the progress dialog itself drives the operation, including calling progress-related methods of the operation method 1002 to obtain progress information, handling progress data sent from the operation method 1002, and/or handling cancel requests.

Significantly, the progress dialog 1000 is consistent regardless of the various operation being performed, e.g., the objects are added to the progress dialog 1000 the same way regardless of what specific operation will be performed, and the results are also gathered and presented in a generic manner via a progress user interface 1010 that allows interaction (e.g., canceling an ongoing operation or OK-ing a completed operation via buttons 1024 and 1026, respectively) in a consistent manner. Messages appear in a status window 1020 along with a progress indicator 1022 as interesting things (e.g., errors or warnings) occur, and a summary remains displayed for canceled or completed operations.

For completed operations, the progress dialog remains displayed, with a viewable history presented in a summary status window. The cancel button 1024 is grayed-out when completed, and the OK button 1024 made to appear active (non-grayed-out) and enabled to close the progress dialog.

In accordance with another aspect of the present invention, there is provided intelligent data refresh logic to update the data changed in one user interface area to other user interface areas. For example, many user interface elements in group policy management console are related and show up in multiple locations in the user interface. Changing an element in one location has an impact on components elsewhere in the user interface. For example, the links to group policy objects can appear in multiple locations, such as on the scope page of either a group policy object or group policy object link, in the treeview such as under one or more organizational units, and on (e.g., two of) the result pane tabs for sites, domains, and organizational units. Moreover, MMC includes a command for a general concept referred to as "New Window from Here" which allows another window to be rendered. Via the refresh logic, changing an attribute of a link in one of these locations results in this information being properly updated in the other locations. As a result, only affected data is generated again, without the performance penalty of completely re-querying to obtain all of the information shown in the tool.

To properly replicate a single change throughout the various aspects of the user interface, the group policy management console implements a refresh infrastructure that allows it to communicate properly with various aspects of the user interface, and if necessary, update the various components. To this end, whenever a change is made, the tree is walked, passing information to each node, which the node can act on and also pass on to any child node, until a leaf node is reached. This gives each node a chance to decide whether the notice is relevant to the data displayed, and possibly change its data itself in response to a change.

Each node in the tree has a cookie, essentially an identifier for the user interface element (if any) of that MMC node. The interface of the object that is modified is also passed, to enable interaction with that object, as is data that indicates what type of information has changed. For example, a WMI filter change will not impact a domain, and thus the domain will not act on that change, except to pass it down to its children, which may be interested. In this manner, the individual pages and sections will receive this change update.

In addition to passing updates for refreshing, additional operations may be performed in response to a change. For example, deletion of a group policy object can be used to trigger a process that deletes the links to that group policy object, along with a progress dialog and so forth for that process. Note that it may be computationally less expensive to regenerate the entire tree than to search and act on the relevant nodes, (e.g., to find each link to delete), in which case regeneration instead may be performed. Note that links may have their own in-memory cached copy of the group policy object to which it is linked, and thus these copies may need actions or updating performed on them. It is also possible to have a single cached copy that is shared between multiple links as necessary, which will facilitate the refresh operation and similar triggered actions.

Although the refresh updates may be propagated without delay, a page that is not being displayed need not update until later, when it is displayed. To this end, a page may mark itself as needing to be updated (or dirty), in which case the page will update when needed, that is, just before it is displayed. Lazy background updating of dirtied, non-displayed pages is also feasible, such as during idle times.

The MMC "New Window from Here" command allows a node to have multiple associated windows, e.g., maintained by the node in a list. As a result, when refreshing, when a node receives refresh data in which that node is interested, the nodes needs to send a refresh message needs to each associated window.

As can be seen from the foregoing detailed description, there is provided mechanism that support the group policy management console user interface, including a context menu map that simplifies the building of context menus, a communication object that facilitates separation of the treeview code from the result pane code, a progress dialog and refresh logic. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer implemented method of managing group policy related data comprising:
providing one or more interfaces to manage group policy related data, the interfaces including two or more selectable group policy objects, the group policy objects comprising at least one of: a collection of files, an object or an attribute located in a network;
providing, from a unified view, the ability to view, manage, and search across one or more sites and to copy and import data to the group policy objects;
receiving a selection of one of the group policy objects;
providing a custom context menu of items related to the selected group policy object, wherein the custom context menu of items is customized based on context for the selected group policy object;
receiving a selection of one of the menu items;
accessing structured context menu data in a data structure in response to the selection of one of the menu items;
providing a custom context menu of commands for the selected one of the menu items based on the structured context menu data, wherein at least one of the commands in the custom context menu of commands is a snap-in supplied command;
receiving from the snap-in tool one or more flags for the context menu of commands, wherein at least one of the flags indicates how to display one of the commands in the context menu of commands; and receiving data for one or more items of the context menu of commands from the snap-in tool in a customized result pane area, wherein at least one of the providing the custom context menu of items or the providing the custom context menu of commands comprises:

processing a context menu map into a static data structure, the context menu map including macro declarations, the macros declarations including definitions of methods; and calling methods in a base class to operate on the static data structure to generate at least one of the context menu of items or the context menu of commands, for a specific node type, the methods in the base class being generic to a plurality of node types include the specific node type.

2. The method of claim 1, wherein the one or more selectable group policy objects are presented in a treeview area of one of the interfaces.

3. The method of claim 2, wherein receiving a selection of one of the group policy objects comprises receiving a selection of one of the group policy objects in the treeview area.

4. The method of claim 2, further comprising receiving an indication of a right-click in the treeview area.

5. The method of claim 4, further comprising providing the context menu of commands in response to the indication of a right-click in the treeview area.

6. The method of claim 1, further comprising receiving a shortcut activation to the context menu of commands.

7. The method of claim 1, further comprising receiving from the snap-in tool one or more command codes for one or more commands of the context menu of commands.

8. The method of claim 1, further comprising receiving from the snap-in tool location information indicating where a command in the context menu of commands is to be displayed relative to another command in the context menu of commands.

9. One or more processor-accessible storage media including processor-executable instructions comprising managing group policy related data, executed by a computing device to cause the computing device to perform actions comprising:

providing, from a unified view, the ability to view, manage, and search across one or more sites and to copy and import data to the group policy objects;

receiving a selection of one of the group policy objects;

providing a custom context menu of items related to the selected group policy object, wherein the custom context menu of items is customized based on context for the selected group policy object;

receiving a selection of one of the menu items;

accessing structured context menu data in a data structure in response to the selection of one of the menu items;

providing a custom context menu of commands for the selected one of the menu items based on the structured context menu data, wherein at least one of the commands in the custom context menu of commands is a snap-in supplied command;

receiving from the snap-in tool one or more flags for the context menu of commands, wherein at least one of the flags indicates how to display one of the commands in the context menu of commands; and receiving data for one or more items of the context menu of commands from the snap-in tool in a customized result pane area, wherein at least one of the providing the custom context menu of items or the providing the custom context menu of commands comprises:

processing a context menu map into a static data structure, the context menu map including macro declarations, the macros declarations including definitions of methods; and calling methods in a base class to operate on the static data structure to generate at least one of the context menu of items or the context menu of commands, for a specific node type, the methods in the base class being generic to a plurality of node types include the specific node type.

10. The processor-accessible storage media of claim 9, the actions further comprising receiving from the snap-in tool one or more command codes for one or more commands of the context menu of commands.

* * * * *